US007659339B2

(12) United States Patent  
Nasreddine et al.

(10) Patent No.: US 7,659,339 B2
(45) Date of Patent: Feb. 9, 2010

(54) LOW MOONEY NITRILE RUBBER THERMOPLASTIC ELASTOMER COMPOSITION WITH IMPROVED PROCESSABILITY

(75) Inventors: Victor Nasreddine, Cranberry, PA (US); Sharon X. Guo, Shanghai (CN); Dirk Schaefer, Leverkusen (DE); Christopher M. Ong, Leverkusen (DE)

(73) Assignees: LANXESS Deutschland GmbH, Leverkusen (DE); LANXESS Inc., Ontario (CA)

( * ) Notice: Subject to any disclaimer, the term of this patent is extended or adjusted under 35 U.S.C. 154(b) by 414 days.

(21) Appl. No.: 11/484,493

(22) Filed: Jul. 11, 2006

(65) Prior Publication Data

US 2007/0208136 A1 Sep. 6, 2007

Related U.S. Application Data

(60) Provisional application No. 60/699,270, filed on Jul. 14, 2005.

(51) Int. Cl.
*C08L 77/00* (2006.01)
*C08L 9/00* (2006.01)

(52) U.S. Cl. ............... 524/514; 525/57; 525/58; 525/60; 525/179; 525/183

(58) Field of Classification Search ............ 525/57, 525/58, 60, 179, 183; 524/514
See application file for complete search history.

(56) References Cited

U.S. PATENT DOCUMENTS 4,508,867 A * 4/1985 Sato ............... 524/434
4,983,678 A * 1/1991 Saito et al. ........... 525/193
5,208,294 A * 5/1993 Brown ............ 525/263
6,281,293 B1 * 8/2001 Fujii ............. 525/233
6,673,881 B2 * 1/2004 Guerin ............ 526/160
6,780,939 B2 * 8/2004 Guerin et al. ......... 525/329.1
6,841,623 B2 * 1/2005 Guerin et al. ......... 525/230
7,291,667 B2 11/2007 Nasreddine et al. ...... 524/514
2003/0220449 A1 11/2003 Jacques et al.

FOREIGN PATENT DOCUMENTS

| CA | 2 356 580 | | 3/2003 |
| CA | 2356580 | * | 3/2009 |
| EP | 0 319 320 | | 4/1992 |
| EP | 0319320 | * | 4/1992 |
| EP | 0 364 859 | | 1/1994 |
| EP | 0364859 | * | 1/1994 |
| EP | 0 559 278 | | 11/1997 |
| WO | 03/020820 | * | 3/2003 |

OTHER PUBLICATIONS

Datbase WPI Week 198738 Derwent Publications Ltd., London, GB; AN 1987-266726 XP002409884.
Anil K Bhowmick et al: "Structure Development During Dynamic Vulcanization of Hydrogenated Nitrile Rubber/Nylon Blends" Sep. 15, 1993, Journal of Applied Polymer Science, John Wiley and Sons Inc. New York, US, pp. 1893-1900 XP000462224 ISSN: 0021-8995.

* cited by examiner

*Primary Examiner*—Ana L Woodward
(74) *Attorney, Agent, or Firm*—Jennifer R. Seng

(57) ABSTRACT

The present invention relates to thermoplastic vulcanizates (TPVs) based on low Mooney, optionally hydrogenated nitrile butadiene rubber and polyamides. The present invention also relates to TPVs based on low Mooney, optionally, hydrogenated nitrile terpolymers and polyamides. TPVs prepared according to the present invention have improved morphology, smaller rubber particle size, and improved processability compared to TPVs containing non-low Mooney, optionally hydrogenated nitrile butadiene rubber.

10 Claims, 3 Drawing Sheets

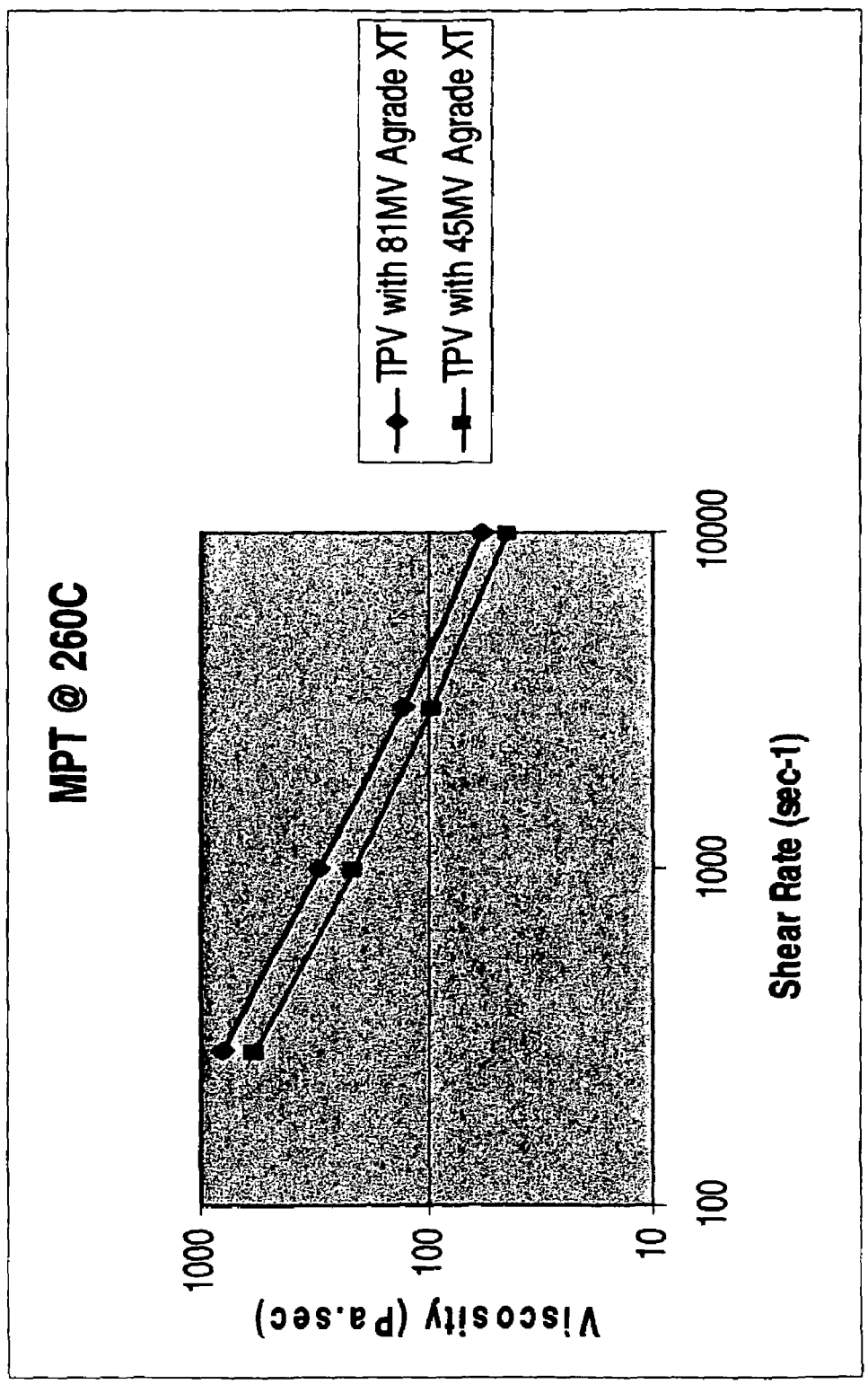
Figure 1: Viscosity of Examples 3 and 4 at different shear rates.

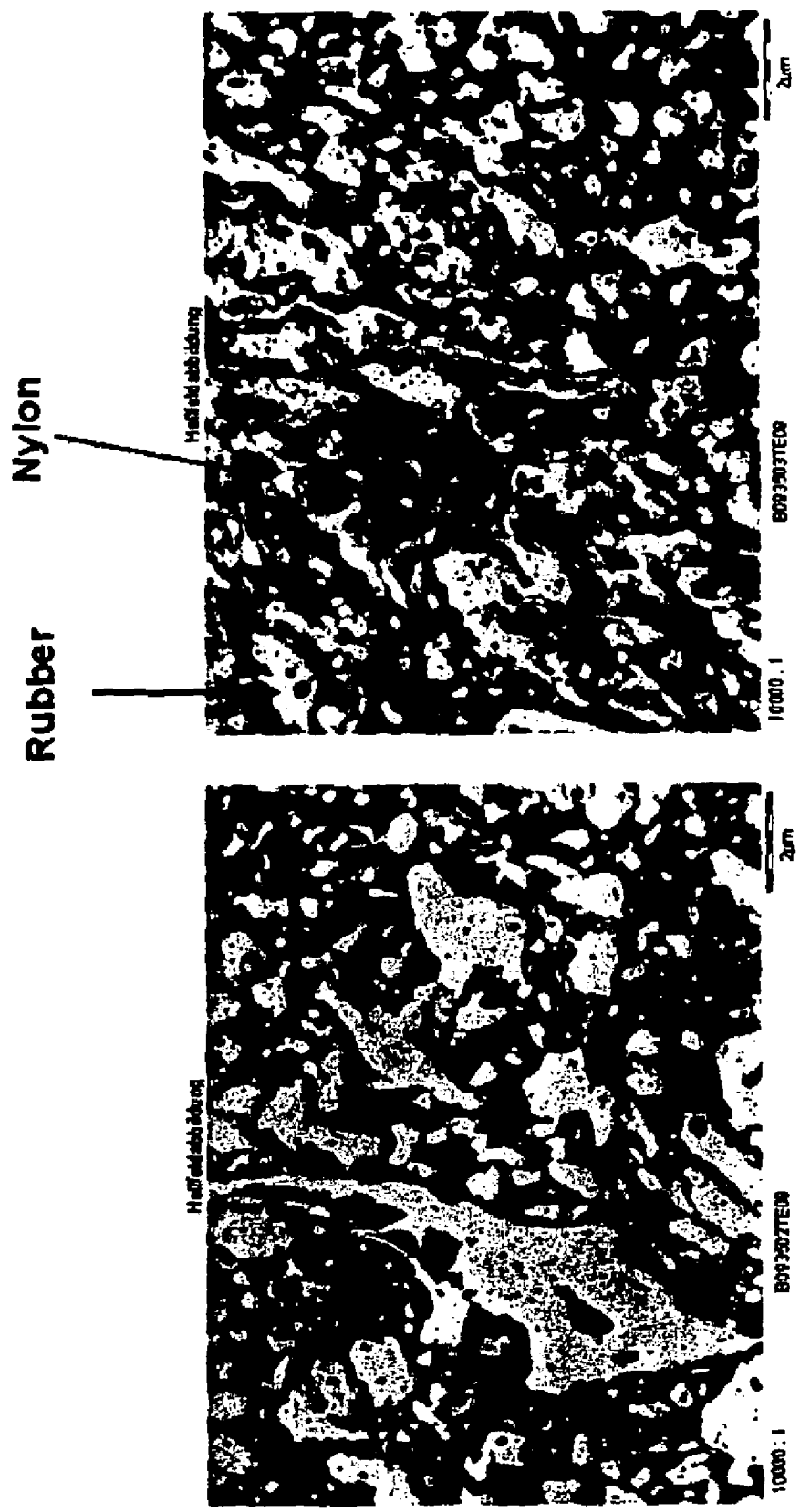
Figure 2: TEM Images of Examples 3 and 4. Rubber: Light; Nylon: Dark

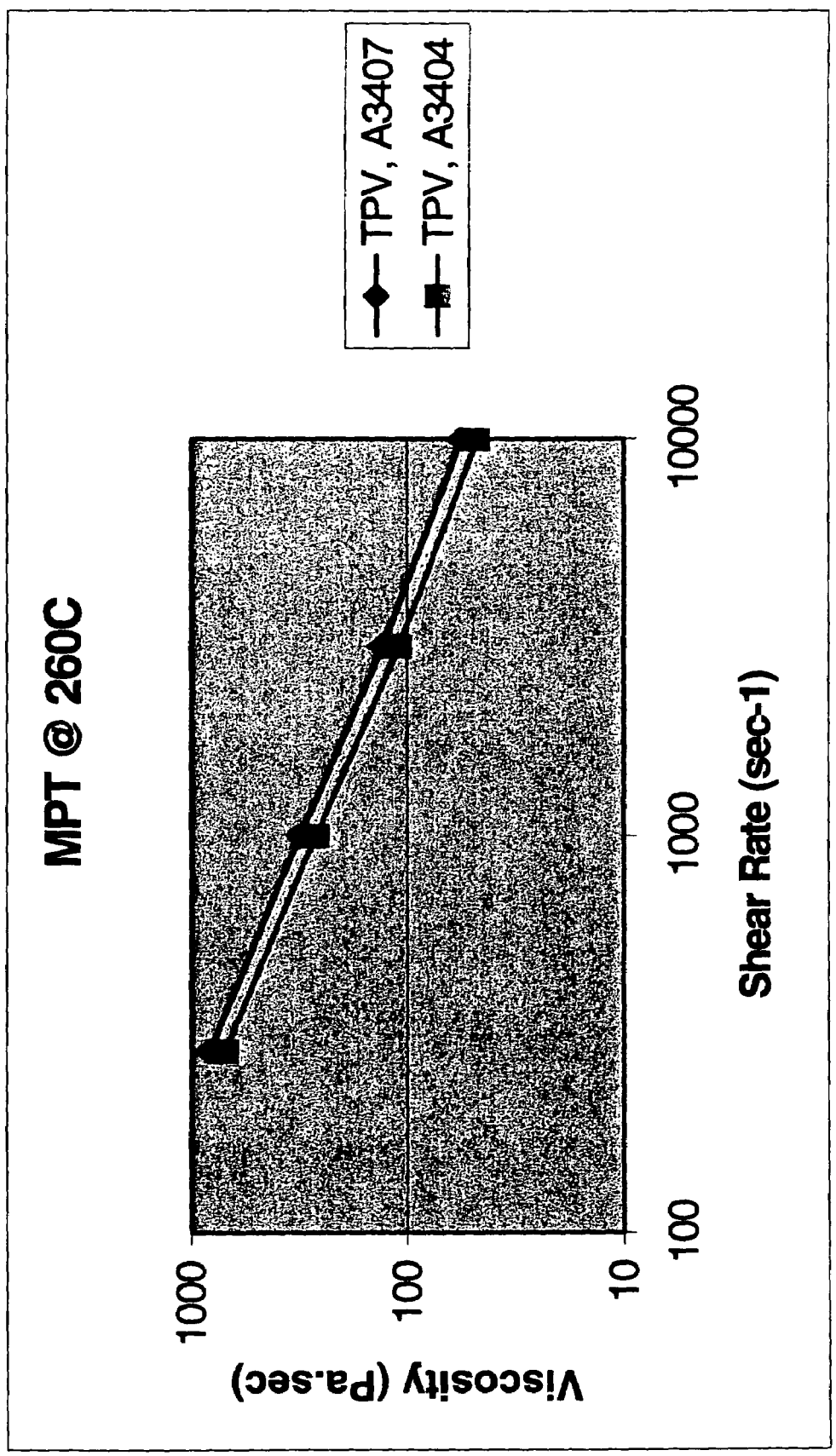
Figure 3: Viscosity of Examples 5 and 6 at different shear rates.

LOW MOONEY NITRILE RUBBER THERMOPLASTIC ELASTOMER COMPOSITION WITH IMPROVED PROCESSABILITY

This application claims the benefit of U.S. Provisional Application Ser. No. 60/699,270 filed on Jul. 14, 2005.

FIELD OF THE INVENTION

The present invention relates to thermoplastic vulcanizates (TPVs) based on low Mooney, optionally hydrogenated nitrile polymers rubber and polyamides. The present invention also relates to TPVs based on low Mooney, optionally hydrogenated nitrile terpolymers and polyamides. TPVs prepared according to the present invention have improved morphology, smaller rubber particle size, and improved processability compared to TPVs containing non-low Mooney, optionally hydrogenated nitrile butadiene rubber. TPVs prepared according to the present invention are readily formable by molding or extrusion, are recyclable, and display excellent heat and oil-resistant properties that render them suitable for many industrial and automotive under-the-hood applications.

BACKGROUND OF THE INVENTION

TPVs are two-phase systems wherein cured rubber particles are finely dispersed in a thermoplastic phase. The mixing temperature must be high enough to melt the thermoplastic phase and also cure the rubber. The curing of the rubber phase occurs under conditions of dynamic vulcanization (curing the rubber during melt mixing), contrary to static curing that typically occurs in a rubber mold. Shearing must continue to be applied to prevent the agglomeration of the rubber particles since small rubber particle size is critical in obtaining a product with high performance. For TPVs to have good performance the following properties are desired: (a) the surface energies of the two phases must match, (b) the molecular weight between inter-chain entanglements in the rubber must be low, (c) thermoplastic should have crystallinity, (d) the rubber should be cured at the mixing temperature, and (e) both phases must be stable at the mixing temperature.

TPVs are processed by techniques commonly used in the plastics industry such as injection molding which makes their fabrication more efficient and cost-effective than thermosets. TPVs have non-Newtonian flow properties and their viscosity is very shear dependent. At low shear rates, their viscosity increases, flow diminishes, and they have a high retention of melt integrity and shape retention when cooled. As the shear rate increases, they become more fluid and can be more rapidly injected into a mould.

Thermoplastic elastomers find many applications, for example in coatings, adhesives and in molded and extruded parts. The latter are valued for their toughness and impact resistance, and find application in automotive parts, mechanical parts, electrical parts and other uses. Specific applications include: seals, wire covers, fuel lines and hoses, cold-air intake tubes, and CVJ boots, pedals, grips, wipers, pipe seals, electrical moldings, as well as injection molded housing and cabinetry for electronic applications.

Improvements in properties are being constantly sought, and often for this purpose polymeric materials are mixed or blended. EP-A1-0 364 859 relates to vulcanizable rubbery compositions containing a polyamide, a partially hydrogenated nitrile rubber and curatives in the nitrile rubber. The partially hydrogenated nitrile rubber, admixed with a curing agent, was gradually added to molten polyamide, with mixing. It is stated that it is preferred to use a polyamide having a low melting point, such as nylon 12. In a preferred embodiment the composition includes maleic anhydride or succinic anhydride. The specification states that the anhydride additive improves mixing between the nylon and the rubber compound. Better results are obtained in an example in which maleic anhydride is used, but the properties of the product obtained are not particularly good, and are not adequate for commercial use.

U.S. Pat. No. 4,508,867 relates to vulcanizable rubbery compositions containing a crystalline polyamide, a synthetic rubbery polymer composed of acrylonitrile or methacrylonitrile, an $\alpha,\beta$-unsaturated carboxylic acid and butadiene, an additive selected from the halides of lithium, magnesium, calcium and zinc, an additive selected from the oxides and hydroxides of magnesium, calcium, barium and zinc and the peroxides of calcium and zinc and further contains sulfur vulcanization active agents. Nylon 11 is the only polyamide whose use is exemplified.

The descriptive portion of the specification suggests that the mixing of the polyamide and the synthetic rubbery polymer should take place at a temperature in the range of from about 50 to about 125° C. In Examples 1 and 2 mixing of nylon 11 and carboxylated nitrile rubber, and other ingredients, took place at 50° C. In Example 3 mixing took place at 190 to 199° C. and Example 4 does not specify the temperature of mixing. It is believed that the compositions of U.S. Pat. No. 4,508,867 do not display adequate heat resistant properties.

WO 03/020820 A1 describes the preparation of heat and oil resistant polymer blends of polyamides and hydrogenated carboxylated nitrile rubber prepared according to a single step process.

Co-pending US Patent Application filed on Dec. 12, 2004 entitled "Multistage Process for the Manufacture of Peroxide Cured HXNBR-Polyamide Thermoplastic Vulcanizates" discloses TPVs having improved morphology and smaller rubber particle size than those previously discovered.

SUMMARY OF THE INVENTION

The present invention relates to thermoplastic vulcanizates (TPVs) based on low Mooney, optionally hydrogenated nitrile butadiene rubber and polyamides.

The present invention also relates to thermoplastic vulcanizate (TPV) based on low Mooney, optionally hydrogenated nitrile terpolymers and polyamides.

The present invention also relates to a process for preparing thermoplastic vulcanizates (TPVs) based on low Mooney, optionally hydrogenated nitrile butadiene rubber or low Mooney, optionally hydrogenated nitrile terpolymers, and/or mixtures thereof and polyamides. The process according to the present invention can involve one or more stages.

BRIEF DESCRIPTION OF THE DRAWINGS

FIG. 1 illustrates the MPT (Monsanto Processability Tester) of TPVs prepared with low Mooney hydrogenated nitrile terpolymers and non-low Mooney hydrogenated terpolymers.

FIG. 2A and AB compare the morphology (TEM: Transmission Electron Microscopy) of a low Mooney hydrogenated nitrile terpolymer to a non-low Mooney hydrogenated nitrile terpolymer.

FIG. 3 illustrates the viscosities of Examples 5 and 6 at different shear rates.

DETAILED DESCRIPTION OF THE INVENTION

Also, all ranges include any combination of the maximum and minimum points disclosed and include any intermediate ranges therein, which may or may not be specifically enumerated herein.

Polyamides useful in the present invention include homopolymers and copolymers that have repeated amide linkages along a polymer chain. The polyamides are preferably of high molecular weight and are crystalline or glossy polymers. Examples include polycaprolactam (nylon 6), polylaurolactam (nylon 12), polyhexamethyleneadipamide (nylon 6,6), polyhexamethyleneazelamide (nylon 6,9), polyhexamethylenesebacamide (nylon 6,10), polyhexamethyleneisophthalamide (nylon 6, IP), polyaminoundecanoic acid (nylon 11), polytetramethyleneadipamide (nylon 4,6) and copolymers of caprolactam, hexamethylene-diamine and adipic acid (nylon 6,66), and also aramids such as polyparaphenylene-terephthalamide. The majority of the polyamides useful in the present invention have softening points and melting points in the range of from 160 to 250° C.

As used throughout this specification, the term "nitrile rubber", "nitrile polymer" or NBR is intended to have a broad meaning and is meant to encompass a copolymer having repeating units derived from at least one conjugated diene and at least one $\alpha,\beta$-unsaturated nitrile.

The low Mooney, optionally hydrogenated nitrile rubbers useful in the present invention and processes for making them are known in the art and are the subject of U.S. Pat. Nos. 6,673,881, 6,780,939 and 6,841,623 the disclosure of which is incorporated by reference for the purpose of Jurisdictions allowing for this feature. Such rubbers are formed by the olefin metathesis of nitrile butadiene rubber with a Ru metathesis catalyst, such as a Grubb's catalyst, followed optionally by hydrogenation of the resulting metathesized NBR.

Low Mooney nitrile polymers useful in the present invention have a Mooney viscosity (ML(1+4) @ 100° C.) of below 25, preferably below 20, more preferably below 15 and most preferably below 10.

Low Mooney hydrogenated nitrile polymers useful in the present invention have a Mooney viscosity (ML(1+4) @ 100° C.) of between 1 and 55, preferably between 5 and 50, more preferably between 10 and 45 and most preferably between 15-40. Low Mooney hydrogenated nitrile polymers useful in the present invention have a polydispersity index of less than 2.5.

As used throughout this specification, the term "nitrile terpolymer rubber" or "LT-NBR" is intended to have a broad meaning and is meant to encompass a copolymer having (a) repeating units derived from at least one conjugated diene, (b) at least one $\alpha,\beta$-unsaturated nitrile, (c) repeating units derived from at least one further monomer selected from the group consisting of conjugated dienes, unsaturated carboxylic acids; alkyl esters of unsaturated carboxylic acids, alkoxyalkyl acrylates and ethylenically unsaturated monomers other than dienes and (d) optionally further copolymerizable monomer(s). If (a) and (c) are conjugated dienes, it is understood that the nitrile terpolymer rubber comprises repeating units derived from at least two different conjugated dienes.

The low Mooney, optionally hydrogenated nitrile terpolymers useful in the present invention and processes for making them are not known in the art and are the subject of co-pending US Patent Application filed concurrently herewith and entitled "Process for the Preparation of Low Mooney Nitrile Terpolymers" the disclosure of which is incorporated by reference for the purpose of Jurisdictions allowing for this feature. Such rubbers are formed by the olefin metathesis of nitrile terpolymers with a Ru metathesis catalyst, such as a Grubb's catalyst, followed optionally by hydrogenation of the resulting metathesized nitrile terpolymers.

Low Mooney nitrile terpolymer rubbers useful in the present invention have a Mooney viscosity (ML(1+4) @ 100° C.) of below 25, preferably below 20, more preferably below 15 and most preferably below 10.

Low Mooney hydrogenated nitrile terpolymer rubbers useful in the present invention have a Mooney viscosity (ML(1+4) @ 100° C.) of between 1 and 55, preferably between 5 and 50, more preferably between 10 and 45 and most preferably between 15-40. Low Mooney hydrogenated nitrile terpolymers useful in the present invention have a polydispersity index of less than 2.5.

The conjugated diene may be any known conjugated diene in particular a $C_4$-$C_6$ conjugated diene. Preferred conjugated dienes are butadiene, isoprene, piperylene, 2,3-dimethyl butadiene and mixtures thereof. Even more preferred $C_4$-$C_6$ conjugated dienes are butadiene, isoprene and mixtures thereof. The most preferred $C_4$-$C_6$ conjugated diene is butadiene.

The $\alpha,\beta$-unsaturated nitrile may be any known $\alpha,\beta$-unsaturated nitrile, in particular a $C_3$-$C_5$ alpha,beta-unsaturated nitrile. Preferred $C_3$-$C_5$ $\alpha,\beta$-unsaturated nitriles are acrylonitrile, methacrylonitrile, ethacrylonitrile and mixtures thereof. The most preferred $C_3$-$C_5$ alpha,beta-unsaturated nitrile is acrylonitrile.

The unsaturated carboxylic acid may be any known unsaturated carboxylic acid copolymerizable with the other monomers, in particular a $C_3$-$C_{16}$ $\alpha,\beta$-unsaturated carboxylic acid. Preferred unsaturated carboxylic acids are acrylic acid, methacrylic acid, itaconic acid and maleic acid and mixtures thereof.

The alkyl ester of an unsaturated carboxylic acid may be any known alkyl ester of an unsaturated carboxylic acid copolymerizable with the other monomers, in particular an alkyl ester of an $C_3$-$C_{16}$ $\alpha,\beta$-unsaturated carboxylic acid. Preferred alkyl ester of an unsaturated carboxylic acid are alkyl esters of acrylic acid, methacrylic acid, itaconic acid and maleic acid and mixtures thereof, such as butyl acrylate, methyl acrylate, 2-ethylhexyl acrylate and octyl acrylate. Preferred alkyl esters include methyl, ethyl, propyl, and butyl esters.

The alkoxyalkyl acrylate may be any known alkoxyalkyl acrylate copolymerizable with the other monomers, preferably methoxyethyl acrylate, ethoxyethyl acrylate and methoxyethoxyethyl acrylate and mixtures thereof.

The ethylenically unsaturated monomer may be any known ethylenically unsaturated monomer copolymerizable with the other monomers, preferably allyl glycidyl ether, vinyl chloroacetate, ethylene, butene-1, isobutylene and mixtures thereof.

An antioxidant may be useful in the preparation of TPVs according to the present invention. Examples of suitable antioxidants include Naugard® 445 (p-dicumyl diphenylamine), Vulkanox® DDA (a diphenylamine derivative), Vulkanox® ZMB2 (zinc salt of methyl-mercapto benzimidazole), Vulkanox® HS (polymerized 1,2-dihydro-2,2,4-trimethyl quinoline) and Irganox® 1035 (thiodiethylene bis(3,5-di-tert.-butyl-4-hydroxy) hydroxy cinnamate or thiodiethylene bis(3-(3,5-di-tert.-butyl-4-hydroxyphenyl)propionate supplied by Ciba Specialty Chemicals.

Suitable peroxide curatives useful in the preparation of TPVs according to the present invention include dicumyl peroxide, di-tert.-butyl peroxide, benzoyl peroxide, 2,2'-bis (tert.-butylperoxy diisopropylbenzene (Vulcup® 40KE), benzoyl peroxide, 2,5-dimethyl-2,5-di(tert-butylperoxy)-hexyne-3, 2,5-dimethyl-2,5-di(benzoylperoxy)hexane, (2,5- bis(tert.-butyl peroxy)-2,5-dimethyl hexane and the like can be used. The high temperature of the polyamide melt influences the selection, however. The best suited curing agents are readily accessible by means of a few preliminary experiments. A preferred peroxide curing agent is commercially available under the trademark Vulcup® 40KE. The peroxide curing agent is suitably used in an amount of 0.2 to 7 parts per hundred parts of rubber (phr), preferably 1 to 3 phr. Too much peroxide may lead to undesirably violent reaction. Sulphur, sulphur-containing compounds and resins can also be used as curatives.

Vulcanizing co-agents can also be used in the preparation of TPVs according to the present invention. Mention is made of triallyl isocyanurate (TAIC), commercially available under the trademark DIAK®7 from DuPont or N,N'-m-phenylene dimaleimide know as HVA-2 (DuPont Dow), triallyl cyanurate (TAC) or liquid polybutadiene known as Ricon® 153 (supplied by Ricon Resins). Amounts can be equivalent to the peroxide curative or less, preferably equal.

Crosslinking density can further be increased by the addition of an activator such as zinc peroxide (50% on an inert carrier) using Struktol® ZP 1014 in combination with the peroxide. Amounts can be between 0.2 to 7 phr, preferably 1 to 3 phr.

It is possible to achieve further crosslinking by using curatives used with carboxylated polymers such as: amines, epoxides, isocyanates, carbodiimides, aziridines, or any other additive that can form a derivative of a carboxyl group.

The ratio of polyamide to low Mooney, optionally hydrogenated nitrile rubber and/or low Mooney, optionally hydrogenated terpolymer can vary between wide limits, preferably 90 parts to 10 parts by weight to 10 parts to 90 parts by weight. More preferable combinations include 40-10 parts polyamide and 60-90 parts rubber. Properties of the conjugate vary, depending on the ratio of polyamide to elastomer. The ratio of polyamide to rubber can vary and can be optimized by simple experimentation by one skilled in the art.

It is possible to include processing oils and extenders or plasticizers in the TPV according to the present invention. Suitable plasticizers include those well known for use with nitrile polymers such as the phthalate compounds, the phosphate compounds, the adipate compounds, the alkyl carbitol formal compounds, the coumarone-indene resins and the like. An example is the plasticizer commercially available under the trademark Plasthall 810, or Plasthall TOTM (trioctyl trimellitate) or TP-95 (di-(butoxy-ethoxy-ethyl) adipate supplied by Morton International. The plasticizer should be a material that is stable at high temperature and will not exude from the conjugate. If plasticizer is to be used it is preferred to melt the polyamide, add a first portion of the hydrogenated carboxylated nitrile rubber, say about half, mix, then add the plasticizer, mix and then add the remainder of the low Mooney, optionally hydrogenated, nitrile rubber or low Mooney, optionally hydrogenated, nitrile terpolymer and continue mixing. The amount of plasticizer used will depend upon the proposed end use of the TPV, but may be between 1 and 40 phr, preferably between 5 and 20 phr. It is further possible to use a blend of polyamides.

It is also possible to use a mixture of optionally hydrogenated low Mooney nitrile rubbers thereof or low Mooney nitrile terpolymers and another elastomer, for example, a carboxylated nitrile rubber (XNBR), a hydrogenated nitrile rubber (HNBR) or a nitrile rubber (NBR), a vinyl acetate rubber (EVM) or a ethylene/acrylate rubber (AEM) or a hydrogenated carboxylated nitrile rubber (HXNBR). Suitable XNBRs are commercially available from Lanxess Deutschland GmbH under the trademark Krynac® and suitable HNBRs are commercially available from Lanxess Deutschland GmbH under the trademark Therban® and suitable NBRs are available from Lanxess Deutschland GmbH under the trademark Perbunan®. EVM is commercially available from Lanxess Deutschland GmbH under the trademark Levapren®. Vamac® D an ethylene acrylic elastomer is commercially available from DuPont.

The present inventive TPV can also contain at least one filler. The filler may be an active or inactive filler or a mixture thereof. The filler may be in particular:

highly dispersed silicas, prepared e.g. by the precipitation of silicate solutions or the flame hydrolysis of silicon halides, with specific surface areas of in the range of from 5 to 1000 m2/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m2/g and primary particle diameters in the range of from 10 to 400 nm;

natural silicates, such as kaolin and other naturally occurring silica;

glass fibers and glass fiber products (matting, extrudates) or glass microspheres;

carbon blacks; the carbon blacks to be used here are prepared by the lamp black, furnace black or gas black process and have preferably BET (DIN 66 131) specific surface areas in the range of from 20 to 200 m2/g, e.g. SAF, ISAF, HAF, FEF or GPF carbon blacks;

rubber gels, especially those based on polybutadiene, butadiene/styrene copolymers, butadiene/acrylonitrile copolymers and polychloroprene;

or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, especially silica made by carbon dioxide precipitation of sodium silicate.

Dried amorphous silica particles suitable for use in accordance with the invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Lanxess Deutschland GmbH.

The TPV according to the present invention can contain further auxiliary products suitable for use with rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts include from 0.1 to 50 wt. %, based on rubber. Preferably the TPV contains in the range of 0.1 to 20 phr of an organic fatty acid as an auxiliary product, preferably a unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8-22 carbon atoms, more preferably 12-18. Examples include stearic acid, palmitic acid and oleic acid and their calcium-, zinc-, magnesium-, potassium- and ammonium salts. Preferably the TPV includes in the range of 5 to 50 phr of an acrylate as an auxiliary product. Suitable acrylates are known from EP-A1-0 319 320, U.S. Pat. Nos. 5,208,294 and 4,983,678. Reference is made to zinc acrylate, zinc diacrylate or zinc dimethacrylate or a liquid acrylate, such as trimethylolpropanetrimeth-acrylate (TRIM), butanedioldimethacrylate (BDMA) and ethylenglycoldimeth-acrylate (EDMA). It might be advantageous to use a combination of different acrylates and/or metal salts thereof. Of particular advantage is often to use metal acrylates in combination with a Scorch-retarder such as sterically hindered phenols (e.g. methyl-substituted aminoalkylphenols, in particular 2,6-di-tert.-butyl-4-dimethylamino-methylphenol). It is possible to incorporate other known additives or compounding agents in the TPV according to the present invention.

The TPVs of the present invention can be prepared according to a single stage or a multi-stage process. According to a single step process, the polyamide can be melted and the optionally hydrogenated low Mooney nitrile rubber or nitrile terpolymer is then added to the melt along with the additives, with stirring in an intensive mixer such as a Banbury or in a high-shear extruder. The mixing temperature of a single step process can range from 150° C. to 300° C., preferably from 170° C. to 270° C. and more preferably from 200° C. to 250° C., depending upon the polyamide grade. Suitable single step processes for use in the present invention are disclosed in CA Patent Application No. 2,356,580.

Also, the TPV of the present invention can be prepared according to a multi-stage process, the first stage involves mixing a polyamide with the optionally hydrogenated low Mooney nitrile rubber or nitrile terpolymer under high shear with the needed additives. Suitable mixing temperature can range from 100° C. to 300° C., preferably from 150 to 240° C., depending upon the polyamide grade. In a second stage according to the present invention, the curative is added to perform dynamic vulcanization and cure the rubber particles under conditions of high shear. It is important that the curative used be added at temperatures where it can be incorporated in such a manner that the curing and mixing rates are controlled. Preferably the curative is added at a temperature below the melting point of the polyamide incorporated in step 1, more preferably at a temperature in the range of between 150 to 240° C., most preferably between 180 to 220° C. After curative addition and dispersion, mixing conditions are adjusted to cause a quick temperature increase to achieve dynamic vulcanization. This necessitates the careful selection of the peroxide and the control of the mixing temperatures and shear conditions.

Also according to the present invention, the process for preparing TPV's can be performed in three stages. The first stage includes preparing a masterbatch of rubber, stabilizers, fillers, plasticizers, and other needed additives. The second stage including intimately mixing of the masterbatch from stage one with a polyamide. The third including dynamically vulcanizing of the blend from stage two to obtain a TPV according to the present invention.

The invention is further illustrated but is not intended to be limited by the following examples in which all parts and percentages are by weight unless otherwise specified.

EXAMPLES

Comparative Example 1 was a terpolymer of carboxylated nitrile butadiene rubber (Perbunan® VP KA 8877 available from LANXESS Corporation) having 33 wt % acrylonitrile; 5 wt % methacrylic acid; and a Mooney viscosity, ML(1+4) @ 100° C. of 31.

Inventive Example 1 was prepared according the process discussed in detail below via a metathesis reaction with Comparative Example 1.

Preparation of Low-Mooney, Optionally Hydrogenated Terpolymers

The metathesis reactions of Examples 1 and 2 were conducted with a 15% total solid and MCB (Monochlorobenzene) was used as the solvent. The Grubb's II catalyst ([1,3-bis-(2,4,6-trimethylphenyl)-2-imidazolidiniylidene]dichloro(phenylmethylene)(tricyclohexylphosphine) and 1-hexene were added to the terpolymer cement and shaken overnight at 25° C. in a glass container.

Comparative Example 2 and Inventive Example 2 were prepared by hydrogenating the Comparative Example 1 terpolymer and Inventive Example 1 terpolymer according to the following subsequent process: The following metathesis contents from the procedure above were then transferred to the reactor in addition to ESBO (Epoxidized Soybean Oil) for hydrogenation. Hydrogenation reactions were carried out in a 0.5 US gallon Parr high-pressure reactor under the following conditions:

| Cement solids | 15% |
| --- | --- |
| Solvent | MCB |
| $H_2$ pressure | 1200 psi |
| ESBO | 1 phr |
| Agitator speed | 600 rpm |
| Reactor temperature | 138° C. |

TABLE 1

Low Mooney Terpolymers

| Example | 1-Hexene (phr) | Metathesis Catalyst (phr) | % Hydrogenation* | $M_n$ | $M_w$ | PDI | ML(1 + 4) @ 100 C. |
|---|---|---|---|---|---|---|---|
| Nitrile Terpolymers | | | | | | | |
| Comparative Example 1 | 0 | 0 | N/A | 73551 | 249925 | 3.4 | 34 |
| Inventive Example 1 | 2 | 0.007 | N/A | 56219 | 132883 | 2.4 | 16 |
| Hydrogenated Nitrile Terpolymers | | | | | | | |
| Comparative Example 2 (Hydrogenated Comp. Ex. 1) | N/A | N/A | >99 | 82577 | 236580 | 2.9 | 81 |
| Inventive Example 2 (Hydrogenated Inv. Ex. 1) | N/A | N/A | >99 | 47000 | 119000 | 2.5 | 45 |

*Both terpolymers where hydrogenated to >99%. This corresponds to RDB (Residual Double Bond content) <1%.

Preparation of TPV Compounds (Examples 3 and 4)

Comparative Example 3

In the first step, 60 phr of HXNBR (Comparative Example 2) and 40 phr of polyamide 6 (Durethan® C 38 F) were blended in the presence of antioxidant Naugard® 445, and process aids: Armeen 18D and Vanfre Vam. The polyamide 6 was melted and the mixture was very well mixed. In the second stage the peroxide (3.5 phr of Vulcup 40KE and 2.2 phr Struktol ZP 1014) were added in a temperature range of between 150-220° C. to the blend prepared from stage 1 and dynamic vulcanization was achieved under high shear conditions. 1 phr of antioxidant Irganox 1035 (thiodiethylene bis (3,5-di-t-butyl-4-hydroxy) hydrocinnamate or thiodiethylene bis(3-(3,5-di-t-butyl-4-hydroxyphenyl)propionate supplied by Ciba Specialty Chemicals was added before the mixing was stopped. The final temperatures in both stages were around 240° C.

The Brabender mixing conditions for the two stages were as follows: 75% fill factor; 95 rpm mixing blade speed; the temperature range was 150-240° C.; 15-20 minutes total mixing time (stage 1+2). Tables 2 and 3 show the formulations and stress-strain data of the TPVs.

Inventive Example 4

Same mixing procedure as Example 3 above except that Inventive Example 2 terpolymer (low Mooney HXNBR) was used.

TABLE 2

Formulation for TPVs

| FORMULATION | Comparative Example 3 | Inventive Example 4 |
|---|---|---|
| ARMEEM ® 18D | 0.5 | 0.5 |
| DURETHAN ® C 38 F | 40 | 40 |
| Terpolymer - Comparative Example 2 | 60 | N/A |
| Terpolymer - Inventive Example 2 | N/A | 60 |
| NAUGARD ® 445 | 1.5 | 1.5 |
| VANFRE VAM | 1 | 1 |
| STRUKTOL ™ ZP 1014 | 2.2 | 2.2 |
| VULCUP 40KE | 3 | 3 |
| IRGANOX ® 1035 | 1 | 1 |

Armeen ® 18D is an octadecylamine available from AkzoNobel and is used to reduce compound stickiness to metal.
Durethan ® C 38 F is a polyamide from Lanxess Deutschland GmbH.
Naugard ® 445 (p-dicumyl diphenyl amine) is a stabilizer from Uniroyal.
Vanfre VamTM is a phosphate process aid from R. T. Vanderbilt.
Struktol ™ ZP 1014 (Zinc Peroxide 50% on inert carrier).
Vulcup ® 40 KE.(α,β-bis(t-butylperoxy)diisopropylbenzene), 40% peroxide.
Irganox ® 1035 is a stabilizer (thiodiethylene bis(3,5-di-t-butyl-4-hydroxy) hydrocinnamate.

TABLE 3

Stress-strain data

| | Comparative Compound Example 3 | Inventive Compound Example 4 |
|---|---|---|
| Hardness Shore A2 (pts.) | 91 | 91 |
| Ultimate Tensile (MPa) | 20 | 19 |
| Ultimate Elongation (%) | 226 | 206 |
| Stress @ 50 (MPa) | 12 | 12 |
| Stress @ 100 (MPa) | 14.6 | 15.2 |

The data illustrates Example 4 which contains the HXNBR having a Mooney viscosity of 45 (Inventive Example 2) has very similar physical properties to Example 3 containing the NBR having a Mooney viscosity of 81 of Comparative Example 2. This indicates that using a lower money nitrile terpolymer rubbers in such thermoplastic elastomer compositions does not deteriorate the performance and properties of such compositions.

Processability

FIG. 1 illustrates the viscosities of the two TPV compounds at different shear rates. The viscosities were measured at 260° C. by MPT (Monsanto Processability Tester, Capillary Rheometer). The data shows that Example 4, containing Inventive Example 2 lower Mooney HXNBR has lower viscosity at all shear rates indicating better processability compared to Example 3, containing Comparative Example 2 HXNBR. This shows that the inventive process of making low Mooney HNBR and the process of blending them with a polyamide leads to thermoplastic elastomer compositions with improved flow and processability characteristics.

Morphology

FIG. 2 illustrates the TEM images (Transmission Electron Microscope) of Examples 3 and 4. The samples where stained with osmium oxide to get a color contrast between the rubber and plastic phases. The light and dark domains correspond to the rubber and plastic phases respectively. The images show that phase inversion (rubber dispersed in plastic) is achieved in both cases. Note the smaller rubber particle size and improved morphology of Example 4. In contrast, the image of Example 3 has larger rubber particle size and a coarser morphology. This shows that using a lower Mooney nitrile terpolymers leads to better morphology, finer dispersion, and a larger number of smaller rubber particles. This is especially important since it is known to those skilled in the art that smaller rubber particle size and finer dispersion leads to improved mechanical properties of such thermoplastic elastomer compositions.

Preparation of TPV Compounds

Examples 5 and 6 were prepared according to the process discussed above, however the following examples contain blends of hydrogenated nitrile rubber according to table 4.

TABLE 4

Formulation

| FORMULATIONS | Comparative Compound Example 5 | Inventive Compound Example 6 |
|---|---|---|
| ARMEEN ® 18D | 0.5 | 0.5 |
| DURETHAN ® C 38 F | 40 | 40 |
| NAUGARD ® 445 | 1.5 | 1.5 |
| THERBAN ® A 3407 | 50 | N/A |
| THERBAN ® AT VP KA 8966 | N/A | 50 |
| THERBAN ® XT VP KA 8889 | 10 | 10 |
| VANFRE VAM | 1 | 1 |
| STRUKTOL ZP 1014 | 2.2 | 2.2 |
| VULCUP 40KE | 3 | 3 |
| IRGANOX ® 1035 | 1 | 1 |

Therban ® A3407 (HNBR from Lanxess Deutschland GmbH; 34 wt % Acrylonitrile; Mooney viscosity, ML(1 + 4) @ 100° C. = 70)
Therban ® AT VP KA 8966 (low Mooney HNBR from Lanxess Deutschland GmbH; 34 wt % Acrylonitrile; Mooney viscosity, ML(1 + 4) @ 100° C. = 39)
Therban ® XT 8889 (HXNBR from Lanxess Deutschland GmbH.)

Processability

FIG. 3 illustrates the viscosities of the Examples 5 and 6 at different shear rates. The viscosities were measured at 260° C. by MPT (Monsanto Processability Tester, Capillary Rheometer). The data shows that Example 6, containing Therban® AT VP KA 8966 has lower viscosity at all shear rates indicating better processability compared to Example 5 containing Therban® A3407. This illustrates that using an HNBR blend containing a low Mooney HNBR and the process of blending it with nylon also leads to thermoplastic elastomer compositions with improved flow and processability characteristics.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A thermoplastic vulcanizate comprising a polyamide and a low Mooney polymer selected from the group consisting of low Mooney, optionally hydrogenated nitrile terpolymers, low Mooney, optionally hydrogenated nitrile polymers or mixture thereof, wherein the low Mooney nitrile terpolymers and low Mooney nitrile polymers have a Mooney viscosity (ML(1+4) @ 100° C.) below 25, and wherein the low Mooney hydrogenated nitrile terpolymers and low Mooney hydrogenated nitrile polymers have a Mooney viscosity (ML (1+4) @ 100° C.) of between 1 and 55 and wherein the low Mooney hydrogenated nitrile terpolymers have a polydispersity of less than 2.5.

2. The thermoplastic vulcanizate according to claim 1, wherein the polyamide is selected from the group of polycaprolactam, polylaurolactam, polyhexamethyleneadipamide, polyhexamethyleneazelamide, polyhexamethylene-sebacamide, polyhexamethyleneisophthalamide polyaminoundecanoic acid, polytetramethyleneadipamide, copolymers of caprolactam, hexamethylenediamine and adipic acid, aramids and mixtures thereof.

3. The thermoplastic vulcanizate according to claim 1, wherein the low Mooney polymer is a low Mooney hydrogenated nitrile rubber.

4. The thermoplastic vulcanizate according to claim 3, wherein the low Mooney hydrogenated nitrile rubber is a copolymer of acrylonitrile, and butadiene having a Mooney viscosity (ML(1+4) @ 100° C.) of between 5 and 50.

5. The thermoplastic vulcanizate according to claim 1, wherein the low Mooney nitrile terpolymer is a hydrogenated nitrile terpolymer is a terpolymer of acrylonitrile, butadiene and butyl acrylate having a Mooney viscosity (ML(1+4) @ 100° C.) of between 5 and 50.

6. The thermoplastic vulcanizate according to claim 1, wherein the low Mooney nitrile terpolymer is a hydrogenated nitrile terpolymer is a terpolymer of acrylonitrile, butadiene and carboxylic acid having a Mooney viscosity of between 5 and 50.

7. The thermoplastic vulcanizate according to claim 1, further comprising an additional elastomer selected from carboxylated nitrile rubber (XNBR), nitrile rubber (NBR), vinyl acetate rubber (EVM, ethylene rubber (AEM) hydrogenated carboxylated nitrile rubber (HXNBR).

8. The thermoplastic vulcanizate according to claim 1, further comprising curative.

9. The thermoplastic vulcanizate according to claim 8, wherein the curative is a peroxide selected from dicumyl peroxide, di-tert.-butyl peroxide, benzoyl peroxide, 2,2'-bis (tert.-butylperoxy diisopropylbenzene, benzoyl peroxide, 2,5-dimethyl-2-5-di(tert-butylperoxy)22,5-dimethyl hexane or mixtures thereof.

10. A process for making a thermoplastic vulcanizate according to claim 1, comprising: mixing a polyamide, a low Mooney polymer and optionally additives under high shear, and subsequently adding a curative.

* * * * *